United States Patent [19]

Hassel et al.

[11] Patent Number: 4,825,321
[45] Date of Patent: Apr. 25, 1989

[54] MODULAR UNITARY DISK FILE SUBSYSTEM HAVING INCREASED DATA STORAGE CAPACITY

[75] Inventors: Michael J. Hassel, Milpitas; Ian C. Felix, Campbell; Claude E. Camp, Milpitas, all of Calif.

[73] Assignee: Plus Development Corporation, Milpitas, Calif.

[21] Appl. No.: 52,709

[22] Filed: May 20, 1987

[51] Int. Cl.[4] .............................................. G11B 5/09
[52] U.S. Cl. ....................................... 360/51; 360/40
[58] Field of Search ................. 360/40, 48, 51; 331/2, 331/49

[56] References Cited

U.S. PATENT DOCUMENTS

| | | | |
|---|---|---|---|
| 3,533,019 | 10/1970 | Knirsch | 331/49 |
| 4,052,682 | 10/1977 | Wilcox | 331/49 |
| 4,314,287 | 2/1982 | Freeman et al. | 360/51 |
| 4,357,635 | 11/1982 | Hasegawa | 360/51 |
| 4,418,322 | 11/1983 | Chang | 331/49 |
| 4,510,461 | 4/1985 | Dickes et al. | 331/2 |
| 4,534,044 | 8/1985 | Funke et al. | 360/51 |
| 4,633,336 | 12/1986 | Horie et al. | 360/51 |

Primary Examiner—Raymond F. Cardillo
Assistant Examiner—David L. Robertson
Attorney, Agent, or Firm—David B. Harrison

[57] ABSTRACT

Higher data storage capacity is realized in a self contained fixed rotating disk expansion board subsystem preferably for a single electronics circuit board accessory slot of a host computer. This greater capacity, e.g. 42 megabytes of formatted storage on two 95 millimeter disks, is achieved by use of a plural zone arrangement wherein each zone contains data tracks in which user blocks are recorded and read out at a data rate unique for the zone. An improved phase locked loop within the data separator uses a separate voltage controlled oscillator for each zone and a commmon charge pump for generating control voltages applied to change the resonant frequency of all of the oscillators, An oscillator disable circuit disables every voltage controlled oscillator other than the selected oscillator, so that it is the only oscillator whose frequency is actually varied by the charge pump during readback/data separation and decode operations. A dual latch circuit extends the margin of a data window in the data separator to ensure that legitimate data bits read back from the data surface are latched for separation. A single microprocessor supervises operations of the subsystem and calculates physical sector location within each zone from logical sector location data supplied by the host computer.

3 Claims, 6 Drawing Sheets

MODULAR UNITARY DISK FILE SUBSYSTEM HAVING INCREASED DATA STORAGE CAPACITY

FIELD OF THE INVENTION

The present invention relates to rotating disk data storage subsystems. More particularly, the present invention relates to a modular unitary disk file subsystem having doubled storage capacity without any concomitant increase in size.

BACKGROUND OF THE INVENTION

The assignee of the present invention has pioneered a category of products now known as fixed disk expansion board products. The original version of the assignee's fixed disk expansion board product line is described in the assignee's U.S. Pat. No. 4,639,863, issued on Jan. 27, 1987, and entitled "Modular Unitary Disk File Subsystem" (hereinafter referred to as "the referenced '863 patent"). The disclosure of the referenced '863 patent is incorporated herein by reference. Reference is also made to other ones of the assignee's patents, including U.S. Pat. No. 4,647,997, issued on Mar. 3, 1987, and entitled "Aerodynamic Latch for Disk File Actuator" and U.S. Pat. No. 4,661,696, issued on Apr. 28, 1987, and entitled "Optical Encoder Which Uses a Rectangular Photodetector Array". Reference is further made to the assignee's following U.S. Patents and Applications: U.S. Pat. No. 4,712,146, issued on Dec. 8, 1987, and entitled "Thin and Compact Micro-Winchester Head and Disk Assembly"; Ser. No. 06/741,588, filed on June 4, 1985, for "Microprocessor Controlled Rigid Disk File Subsystem"; and U.S. Pat. No. 4,703,176, issued on Oct. 27, 1987, and entitled "Compact Polyphase Optical Position Encoder". These patents and applications describe and claim separate aspects of the fixed disk expansion board described in the referenced '863 patent, and the reader is referred to them for further details.

While the fixed disk expansion board described in the referenced '863 patent met with immediate and widespread commercial acceptance and success from its market introduction in mid-1985, the subsequent introduction of more complex software applications programs, such as spreadsheet and computer aided design, with increased on-line mass storage requirements, has created a hitherto unsolved need for greater data storage capacity in a form factor substantially no greater than that required by the disk drive subsystem 5 originally disclosed in the referenced '863 patent, namely a 3½" diameter, dual fixed disk based subsystem meeting a width constraint not substantially in excess of one inch of overall thickness and which is suitable for plugging into and occupying a single electronics circuit board expansion slot location of a personal computer, such as the IBM TM Personal Computer, and equivalents thereof.

Past proposals for zoning disk data storage surfaces into zones of concentric tracks characterized by different data transfer rates to achieve a more uniform flux transition density over the useful radius of the storage disk, as exemplified by the Ottesen U.S. Pat. No. 4,016,603 for example, have required complex circuitry to accomodate the differing data transfer rate bandwidths associated with the zones. Other references relating to optimization of data transfer rate with disk radius which have also been considered in the preparation of this patent application describe a variety of variable data rate proposals and they include the Hasegawa U.S. Pat. No. 4,357,635; Stovall, Jr. U.S. Pat. No. 2,901,737; Hibner U.S. Pat. No. 3,524,172; Gleim et al. U.S. Pat. No. 3,375,507; Freeman et al. U.S. Pat. No. 4,314,287; and King et al. U.S. Pat. No. 2,843,841.

A hitherto unsolved need has arisen for a compact self contained fixed disk data storage subsystem which achieves considerably greater user data storage capacity without any concomitant increase in overall physical dimensions, including circuit complexity or size.

SUMMARY OF THE INVENTION WITH OBJECTS

A general object of the present invention is to overcome limitations and drawbacks of the prior art by providing an improved fixed disk expansion board storage subsystem with doubled data storage capability without any increase in the physical size thereof.

A more specific object of the present invention is to provide each physical data storage surface with a more optimized information storage density by providing a plurality of zones of concentric data tracks, with a radially outward zone of tracks having a data transfer rate and magnetic storage flux density at a higher rate, and with a radially inward zone of tracks having a data transfer rate and magnetic storage flux density at a lower rate which is not integrally related to the higher data transfer rate.

Another object of the present invention is to provide an improved, yet simple single phase lock loop for data extraction in the read mode which operates automatically at the proper data transfer rate depending upon the data zone from which the data is being recovered from the storage surface.

Yet another object of the present invention is to provide a single phase lock loop for data separation and recovery in a disk file controller which employs a single charge pump to adjust the frequencies of plural voltage controlled oscillators each of which is adapted for a read data transfer rate and singly enabled for aiding data separation and recovery from a particular data zone of the disk storage surface.

A further object of the present invention is to provide a raw data dual latch arrangement which provides increased data window margin while still enabling fabrication of the data separator function as a single monolithic CMOS integrated circuit array.

One more object of the present invention is to provide a mapping arrangement by which additional physical sectors located in a data storage track in an outer zone are mapped by the subsystem controller into logical cylinders (data tracks) in order to maintain compatibility with a predetermined standard logical track and sector arrangement of existing disk operating systems for small computers, such as so-called "personal computers".

Another more specific object of the present invention is to provide a mapping arrangement by which data sectors of 653 physical data tracks on a single physical data surface are mapped automatically into 612 logical data tracks of 17 sectors each on two logical data surfaces.

In accordance with the present invention, a high capacity rotating disk memory accessory subsystem module is provided for attachment and use entirely within a housing of a host computer at one of a plurality of accessory plug-in locations originally provided for a single, substantially flat electronics printed circuit accessory card. The slot location has predetermined actual length and height dimension constraints and a nominal width dimension constraint for an electronics printed circuit accessory card, the width dimension constraint being typically defined by the distance between adjacent accessory plug-in slot locations. Each slot location has at least one multiple signal path receptacle along an attachment surface for providing electrical connection to data, address and control buses of the host computer. The high storage capacity subsystem module includes a support frame, a rotating disk assembly supported by the frame including a data storage disk having a diameter not substantially greater than 95 millimeters and rotating at a substantially constant angular velocity, and a head transducer selectively positionable at a concentric data track lying in one of a plurality of zones of factory formatted concentric data tracks formed on a data storage surface of the disk. Preferably, there is at least one outer zone of tracks for containing data recorded therein at a first data rate, and an inner zone of tracks for containing data recorded therein at a second data rate. The data storage surface contains in excess of ten megabytes of formatted data. A head mover moves the head transducer among selected data tracks during track seeking and holds the head in alignment with a selected data track during track following. A printed circuit board supported by the frame carries electronics circuitry including a connector for enabling electrical connection of the subsystem to the host computer via a said expansion slot receptacle without cabling. A data transducer position control is provided in circuitry attached to the circuit board for controlling the position of the head via the head mover in response to logical cylinder and head information provided by the host computer. A user data controller circuit on the printed circuit board controls coding for storage and storage of user data blocks in sectors on said surface, and controls retrieval and decoding of user data blocks read from sectors on said surface in response to logical sector information provided by the host computer. The data controller includes a phase lock oscillator for aiding decoding of data read from sectors of said disk surface. The phase lock oscillator automatically switches its bandwidth (frequency) in accordance with the selection of a track as within a given zone so that the phase lock oscillator is responsive to data recorded at the first data rate and data recorded at the second data rate. An interface circuit is connected to the connector, to the position control and to the user data controller. The interface obtains control signals and user data blocks from the host computer for storage at selected track and sector locations on the disk surface logically specified by the host, and it supplies status signals and decoded user data blocks to the host computer.

The circuitry of the phase locked oscillator of the data separator within the user data controller and which includes multiple voltage controlled oscillators commonly controlled by a single charge pump forms an aspect of the present invention.

A dual latch arrangement to extend the window margin of the data separator is another aspect of the present invention.

These and other objects, advantages, aspects and features of the present invention will be more fully understood and appreciated upon considering the following detailed description of a preferred embodiment, presented in conjunction with the accompanying drawings.

DETAILED DESCRIPTION OF A PREFERRED EMBODIMENT

Figure 1:
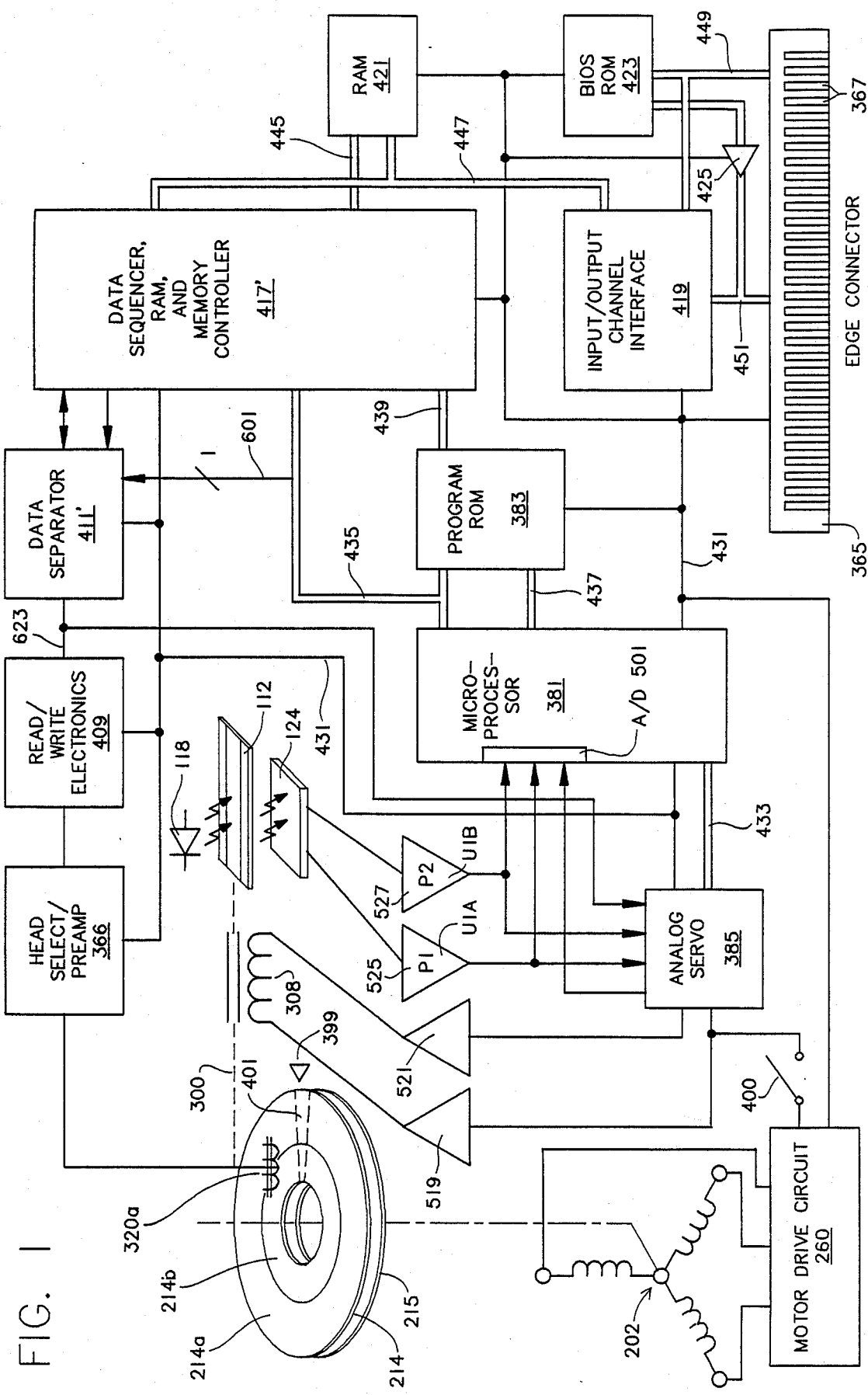
FIG. 1 is an electrical block diagram of control electronics for a disk file subsystem 5 in accordance with the principles of the present invention.

This specification should be read in conjunction with the referenced '863 patent. Structural elements which are the same or equivalent in function in these disclosures carry the same reference numerals, to facilitate understanding of the present invention. Thus, the referenced '863 patent should be consulted for characteristics and functions of elements appearing e.g. in FIG. 1 hereof which are not specifically discussed herein.

As shown in FIG. 1, a miniaturized rotating non-removable disk data storage subsystem 5' of the type constructed in accordance with the referenced '863 patent includes two data storage disks 214 and 215 which are rotated at a regulated constant angular velocity of 3000 rpm by a very thin three phase electronically commutated (brushless) direct drive spindle motor 202.

The disks 214 and 215 are typically of an aluminum substrate upon which a thin film magnetic storage medium has been formed either by known plating or sputtering processes. Each data surface is served by a positionable read/write data transducer head 320, there being four such heads 320a, 320b, 320c and 320d (head 320a for the top storage surface of disk 214 being shown electrically in FIG. 1). The heads 320a-d are commonly stacked via a head position actuator for common arcuate movement along a generally radial path relative to the storage disks 214 and 215 by a head carriage subassembly 300 which is driven by a rotary actuator motor 308.

Preferably, the heads are of the mini-composite variety having two rails, one of which includes the winding 320a depicting the topmost head in FIG. 1. This is to be contrasted with the earlier used three-rail mini-monolithic heads. As a consequence of the newer two-rail head structures, approximately forty additional tracks are available, resulting in a greater total number (654) of concentric data tracks (812 tracks per inch) being available.

With 654 concentric tracks on four data surfaces, the subsystem 5' achieves an increased maximum data storage capacity of 42.26 megabytes of formatted data, typically configured as two 21.13 megabyte on-line logical volumes. Other configurations of formats and logical volume sizes are easily provided under program control in order to accomodate a virtually unlimited variety of user applications and logical partitions between tasks and/or operating systems.

Each data storage surface is divided into e.g. two data zones. For example, as shown in FIG. 1, the top surface is divided into two data zones of concentric data tracks, a radially outer zone 214a, and a radially inner zone 214b. Physical tracks 0 through 415 lie in the outer zone 214a, and physical tracks 416 through 653 lie in the inner zone 214b. The outer zone 214a includes 34 physical sectors and a spare sector while the inner zone 214b includes 28 sectors and a spare sector. Each physical sector typically includes 512 bytes of user data and is preferably formatted at the factory in accordance with the data format set forth in FIG. 20 of the referenced '863 patent. By controlling the placement of the format for each track on the disk surface at the factory to avoid any media defects otherwise falling in non-assignable regions containing sector address mark fields and appropriate spindle speed tolerance margins for such regions, it has been found practical to rely upon only one single spare sector in each track, rather than losing the use of the entire track as has been the consequence of media defects previously.

A single fine position servo sector 401 is provided for each physical data track on each data storage surface at a location marked by an internal index spindle clocking signal 399 put out once each revolution of the disks 214, 215. This narrow servo sector 401 is factory prerecorded with track centerline location information. During track following operations of the disk file subsystem 5, the servo sector centerline information is read by the head which is following that particular data track. Since this fine position servo information is recorded for each track on each data surface, any possible spindle tilt or drift due to thermal shifts will be taken into account by the fine position servo system. Zones and timers as described in connection with FIG. 2 of U.S. Pat. No. 4,419,701 are preferably employed in order to speed up the head settling time at the destination track and enhance performance of the actuator subassembly 300 at the completion of track seek operations.

The functions of the data sequencer 413, random access memory 415 (and buses 441, 443), and the memory controller 417 described in the referenced '863 patent have now been combined into a single VLSI circuit 417' shown in FIG. 1. This combined circuit 417' is commercially available as product code OMTI 20513 from Scientific Microsystems, Inc., 339 N. San Bernardo Ave., Mountain View, Calif. 94043, and its package takes up less than half of the printed circuit board space earlier required for the separate sequencer 413, memory 415, and memory controller circuits 417. The internal random access memory provided within the chip 417' has the capability of storing and directly accessing 64 bytes of control information.

Also newly found in the circuit arrangement depicted in FIG. 1 is the extension of a lowest order bit line (A0) (reference numeral 601 in FIG. 1) of the address bus 435 from the supervisory microprocessor controller 381 directly to the data separator 411'. The bit value of this line, whether one or zero, enables the microprocessor 381 to command the data separator 411' to operate at the data transfer rate appropriate for whichever zone, either the outer zone 214a or the inner zone 214b, in which the heads 320 are then positioned for read/write operations. Since the microprocessor controller 381 keeps track of head position in real time by physical cylinder number (a cylinder being a data track location for all of the surfaces, since the multiple heads are ganged together and are commonly moved by the rotary actuator structure 300), it knows whether the heads 320 are in the outer zone 214a or in the inner zone 214b. This determination is preferably made at just prior to beginning a seek operation. If the destination track to be sought to lies across the boundary between the two zones, the controller 381 notes this change in zone and signals the data separator 411' just before the seek is commenced. Thus, the data separator 411' is able to switch and settle its circuitry to the changed zone while the actuator structure 300 is completing relocation and settling of the head structure to the destination cylinder location in the different zone.

In order to provide a more optimized magnetic flux density throughout each data surface, a data transfer rate of 8.25 MHz is employed for the outer zone 214a, while a data transfer rate of 6.75 MHz is employed for the inner zone. With this arrangement, the highest flux change per inch density is 14,349 for the innermost track (track 415) of the outer zone 214a, and the highest flux change per inch density is 14,928 for the innermost track (track 653) of the inner zone 214b, assuming in both cases that spindle speed tolerance is ± one half percent and that the upper speed tolerance limit of 3030 RPM is actually present in this worst case scenario.

Figure 2:
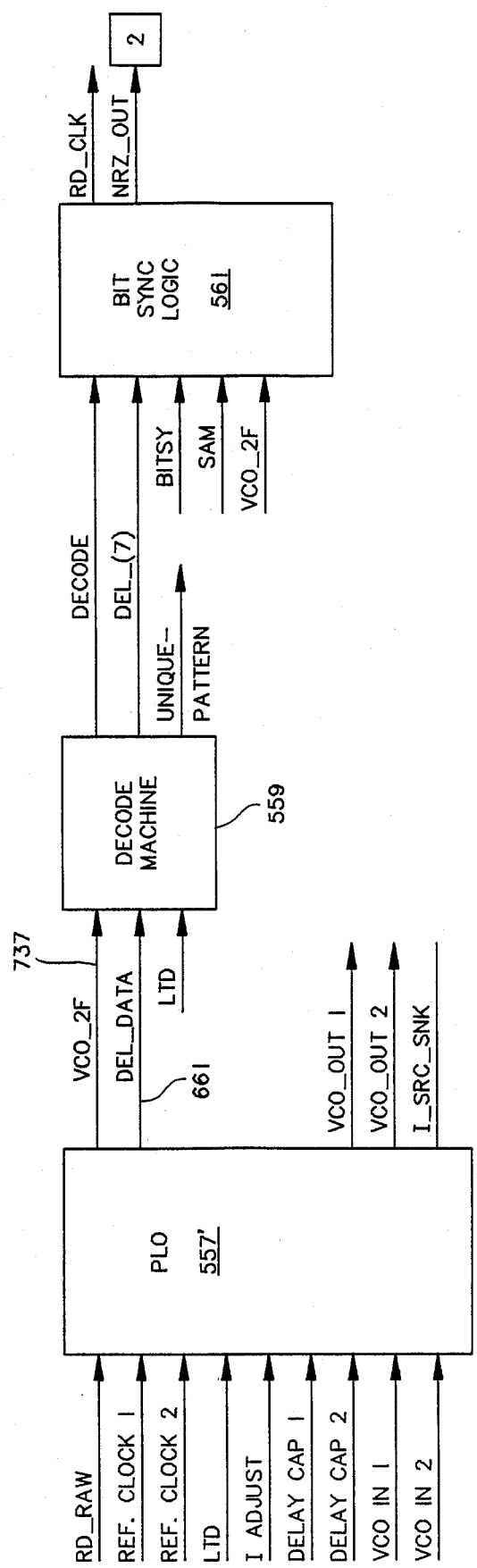
FIG. 2 is a functional block diagram of a portion of a data separator 411 of the disk file subsystem 5 depicted in FIG. 1.

FIG. 2 sets forth a portion of the data separator 411' which is depicted and discussed in conjunction with FIG. 19 of the referenced '863 patent. FIG. 2 depicts a phase locked oscillator 557' which is slightly different in structure than the original PLO 557 described in the referenced '863 patent although its function to define the bit cell boundaries and thereby aid latching of raw data bits as they exist on each formatted data surface of the disks 214, 215 remains the same.

Figure 3:
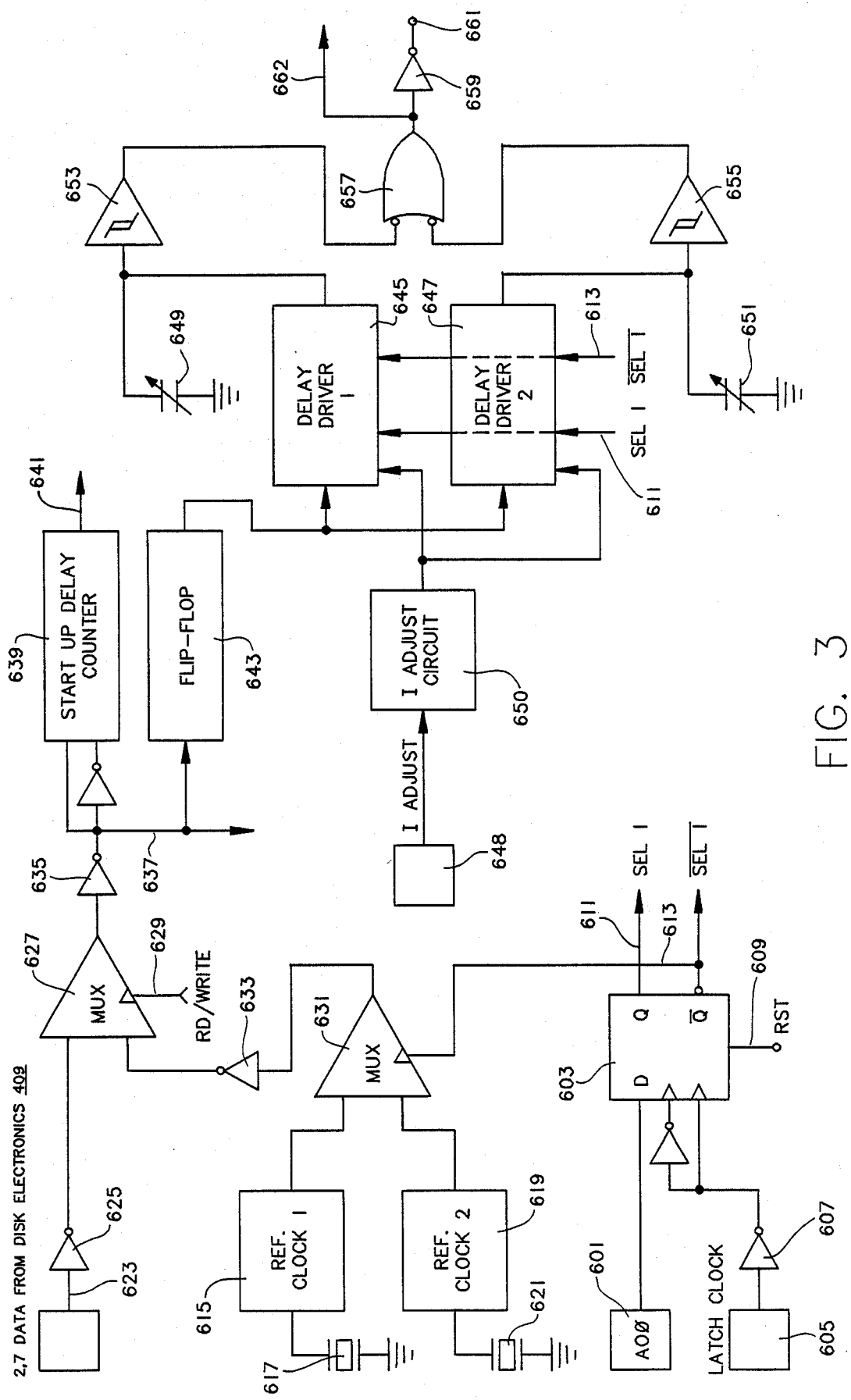
FIG. 3 is a digital logic circuit diagram of a portion of the phase locked oscillator 557 depicted in FIG. 2.

Referring to FIG. 3, the single bit zone signal on line 601 sets a D latch 603 in the data separator 411'. A latch clock signal on a line 605 is inverted by an inverter 607 and as inverted, clocks the latch 603. The latch 603 is reset by a power on reset ("RST") signal on a line 609 which is commonly generated and extends to other circuit elements of the PLO 557'. The Q output of the latch 603 provides a SEL 1 zone signal on a line 611, and the BAR Q output of the latch 603 provides a BAR SEL1 zone signal on a line 613. These signals on lines 611 and 613 control switching of data paths and clocking rates appropriate for the outer zone data rate, and the inner zone data rate within the PLO 557'.

A first clock generator 615 generates an 8.25MHz reference clocking rate for the outer zone 214a. This generator 615 includes a crystal frequency standard 617 operating e.g. at 33 MHz (four times the reference rate). This first generator is preferably the clock which clocks the memory controller 417' at its proper data handling rate.

A second clock generator 619 generates a 6.75MHz reference clocking rate for the inner zone 214b. This generator 619 includes a crystal frequency standard 621 operating e.g. at 27MHz (also four times the reference rate).

Raw data from a selected data surface, track and sector enters the data separator 411' on a line 623 from the read/write electronics 409. This data is preferably compressed in a suitable data compression format such as 2,7 run length limited, variable length code with fixed data rate. Coding and decoding methods and apparatus for this type of code are taught generally by the Eggenberger et al. U.S. Pat. No. 4,115,768, for example. The raw data from the disk is inverted by an inverter 625 and enters one path of a two path multiplex circuit (switch) 627 which is switched by a read/write control signal on a line 629. The read/write control signal on the line 629 is generated from the read gate and write gate signals entering the data separator circuit 411, as shown in FIG. 19 of the referenced '863 patent.

A multiplex circuit 631 selects the appropriate clock signal from either the outer zone clock generator 615 or the inner zone clock generator 619, depending upon the location of the head within the outer or the inner zone. The clock signal from the selected one of the clock generators 615 and 619 is inverted by an inverter 633 and also enters the multiplex circuit 627. During data writing operations, the PLO 557' is clocked by the selected clock signal so that it follows closely in frequency the appropriate data rate for the particular zone in which the head is presently located for writing data to the disk data surface. When a subsequent read operation occurs, since the PLO 557' has been following the correct frequency, all that need occur for lock up is phase adjustment. This arrangement enables the PLO 557' to phase lock to the data rate of the data being read from the disk surface much faster than if both frequency and phase had to be adjusted.

In the read mode, the encoded data bits read from the selected track and passing through the multiplex circuit 627 are inverted by an inverter 635 and put out on a line 637. A start-up delay counter 639 counts these incoming flux transitions until a predetermined count is reached. When the predetermined count of the delay counter 639 is reached, an output line 641 becomes enabled which in turn enables one of the variable frequency oscillators 673 or 675 of the PLO 557', to be described below in conjunction with FIG. 4.

The data signal on the line 637 also enters a flip-flop 643 whose output drives two delay drivers, a first delay driver 645 operating at the data rate for the outer data zone 214a, and a second delay driver 647 operating at the data rate for the inner data zone 214b. External trim capacitors 649 and 651 and Schmidt triggers 653 and 655 are respectively connected to and form part of the two delay drivers 645 and 647. The flip-flop and the selected ones of delay drivers 645, 647, trim capacitors 649, 651, and Schmitt triggers 653, 655 function as a one shot for generating pulses of uniform shape and duration with each flux transition read from the selected data surface.

The phase locked oscillator 557' generates a data window having a duration of approximately 60 nanoseconds for the outer zone 214a and having a duration of approximately 74 nanoseconds for the inner zone 214b. A raw data pulse read from the disk surface must fall within the data window in order to be recognized and captured as such. The timing of arrival of the raw data pulse with respect to the data window establishes a phase comparison which is used to speed up, or to slow down the phase lock oscillator. Ideally, each raw data pulse falls directly in the center of the data window. The trim capacitors 649 and 651 enable trimming of the timing of the raw data pulse at the factory nominally to place it at the center of the data window.

The shaped output from either the Schmitt trigger 653 (outer data zone) or the Schmitt trigger 655 (inner data zone) is passed through an OR gate 657 and an inverter 659 to an output line 661. A non-inverted output is provided directly from the gate 657 on a line 662. The SEL 1, BAR SEL 1 control signals on the lines 611 and 613, control which delay driver 645, 647 will be selected. Whichever delay driver 645 or 647 which is not enabled remains in a high state, thereby not interfering with operation of the enabled delay driver.

A current or I Adjust signal enters the data separator 411' at a block 648. This signal represents current trim adjustment made at the factory in order to accomodate varying characteristics among different monolithic data separator chips encountered during the manufacturing process. This I Adjust signal is processed by a circuit 650, and is used to bias the operational speed of the delay drivers 645 and 647 shown in FIG. 3 and the charge pump 685 shown in FIG. 4.

Figure 4:
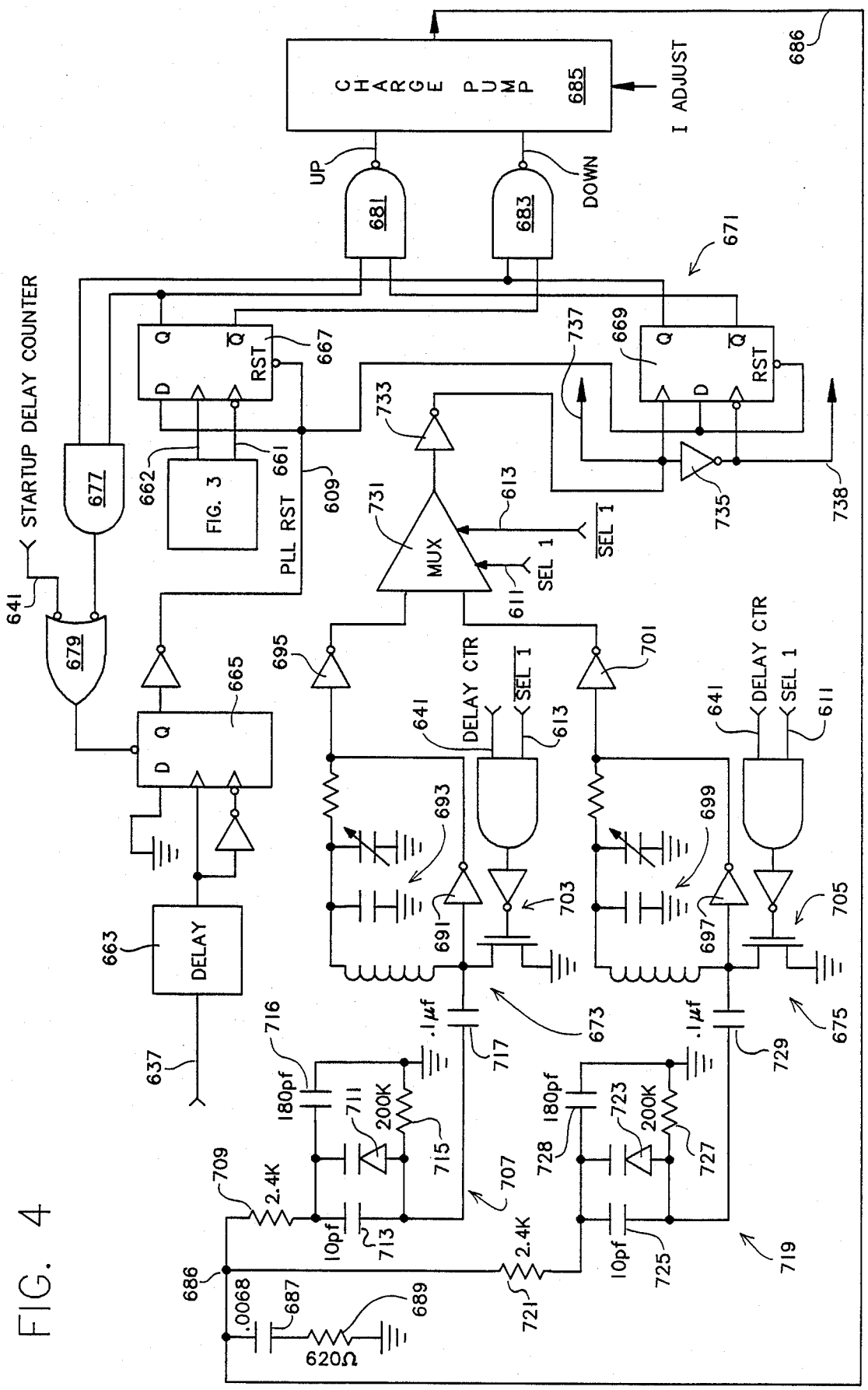
FIG. 4 is a digital logic and analog circuit diagram of other circuitry comprising the phase locked oscillator 557 depicted in FIG. 2.

Turning now to FIG. 4, the raw data on the line 637 passes on a phase detector enable path through a propagation delay matching circuit 663 to set a phase detector enable latch 665. The latch 665 puts out the power on reset (RST) signal on the line 609, which also enables the latch 603 discussed above (FIG. 3). The power on reset (RST) signal on the line 609 enables two latches 667 and 669 which comprise the phase detector 671. The phase detector is shared between the two frequencies of the two data zones 214a and 214b. The flip-flop 667 is clocked by the delayed data output on the line 661 (FIG. 3). The flip-flop 669 is clocked by a rising edge of a signal generated by one of the two voltage controlled oscillators 673 or 675. An AND gate 677 detects when both of the flip-flops 667 and 669 have been set and thereupon resets the latch 665 by a signal passing through an OR gate 679, the other input of which is drived by the signal on the line 641 from the startup delay counter 639.

Two NAND gates, a charge-up gate 681 and a charge-down gate 683 having inputs connected to the latches 667 and 669 as shown in FIG. 4 assure that there is no overlap in the charge up and charge down signals put out by the latches 667 and 669. The outputs from the gates 681 and 683 enter a CMOS current switch configured as a charge pump 685. The charge pump 685 either sources or sinks current over a line 686 to either raise or lower the voltage stored across a storage capacitor 687 within a filter network also including a resistor 689 to ground.

In operation of the phase comparator, if an incoming raw data bit arrives before the middle of the PLL data window, latch 667 becomes set before the latch 669, causing a pump up signal to be delivered to the charge pump 685 through the NAND gate 681, and the charge pump 685 begins to source current into the capacitor 687 to increase the frequency of the selected VCO 673 or 675 thereby to speed it up. If a mid-data window transition signal generated from the selected VCO sets the latch 669 before the raw data pulse sets the latch 667, then a pump down signal is delivered to the charge pump 685 via the NAND gate 683, and the charge pump 685 begins to sink current from the capacitor 687 thereby to lower the voltage across it and thereby decrease the frequency of the VCO. In this manner the phase of each incoming raw data bit relative to the nominal phase of the selected VCO is compared and used to trim its frequency (and thereby its phase). Thus, the VCO closely follows the raw data rate during read back operations from the disk surface.

The VCO 673 includes an amplifier 691 having a tank circuit 693 tunable to resonance at the outer zone data rate and a buffer amplifier 695. The VCO 675 includes an amplifier 697 having a tank circuit 699 tunable to resonance at the inner zone data rate and a buffer amplifier 701. Only one of the oscillators 673 and 675 is active at a time, and gating circuits 703 and 705, respectively responsive to the BAR SEL 1 and Delay Counter signals on the one hand, and to the SEL 1 and Delay Counter signals on the other, place a low impedance load across the input of the de-selected VCO, so that only one of them will be able to operate at one time.

A voltage controlled diode network 707 includes an isolation resistor 709, a voltage controlled diode 711, a small value capacitor 713, a resistor 715, and a capacitor 716. This network adds and subtracts a voltage controllable capacitance to the tank circuit 693 of the voltage controlled oscillator 673 via an isolation capacitor 717. Similarly, a voltage controlled diode network 719 includes an isolation resistor 721, a voltage controlled diode 723, a small value capacitor 725, a resistor 727 and a capacitor 728. This network adds voltage controllable junction capacitance of the diode 723 to the tank circuit 699 of the voltage controlled oscillator 675 via an isolation capacitor 729. If the charge pump receives a charge up signal from the gate 681, an increased current flow causes the voltage stored across the capacitor 687 to increase, thereby causing the bias voltage applied to the diodes 711 and 723 to increase, which in turn causes the junction capacitance to decrease. This decreased capacitance is applied to the tank circuits 693 and 699. However, since only one of the VCO's 673, 675 is enabled at any time, only the frequency of the enabled VCO is altered in this manner.

A multiplexer 731 selects as its output the signal generated by the enabled VCO 673 or 675. This output then passes into the flip-flop 669 of the phase detector through two inverters 733 and 735. A line 737 provides the VCO-2F signal required for proper operation of the decode machine 559 depicted in FIG. 2; and a line 738 provides an inverse of (BAR) the VCO-2F signal.

The start up delay driver 639 comprises a flip-flop string ending with an exclusive-OR gate. The driver 639 functions to cause the selected VCO to start up in phase with incoming raw data from the data surface. Whenever the microprocessor controller 381 determines that a destination track will lie across the boundary between the two data zones 214a and 214b, preparatory to commanding a track seeking operation of the actuator structure 300, the address bit on the line 601 is changed and latched into the data separator 411'. When this change in bit value is received, the delay driver 641 stops the enabled VCO 673 or 675 until after the multiplexer 631 has switched clocks. After the third bit of new raw data has arrived, the startup delay driver 639 enables the appropriately selected VCO 673 or 675, thereby causing it to start in phase with incoming data.

Figure 5:
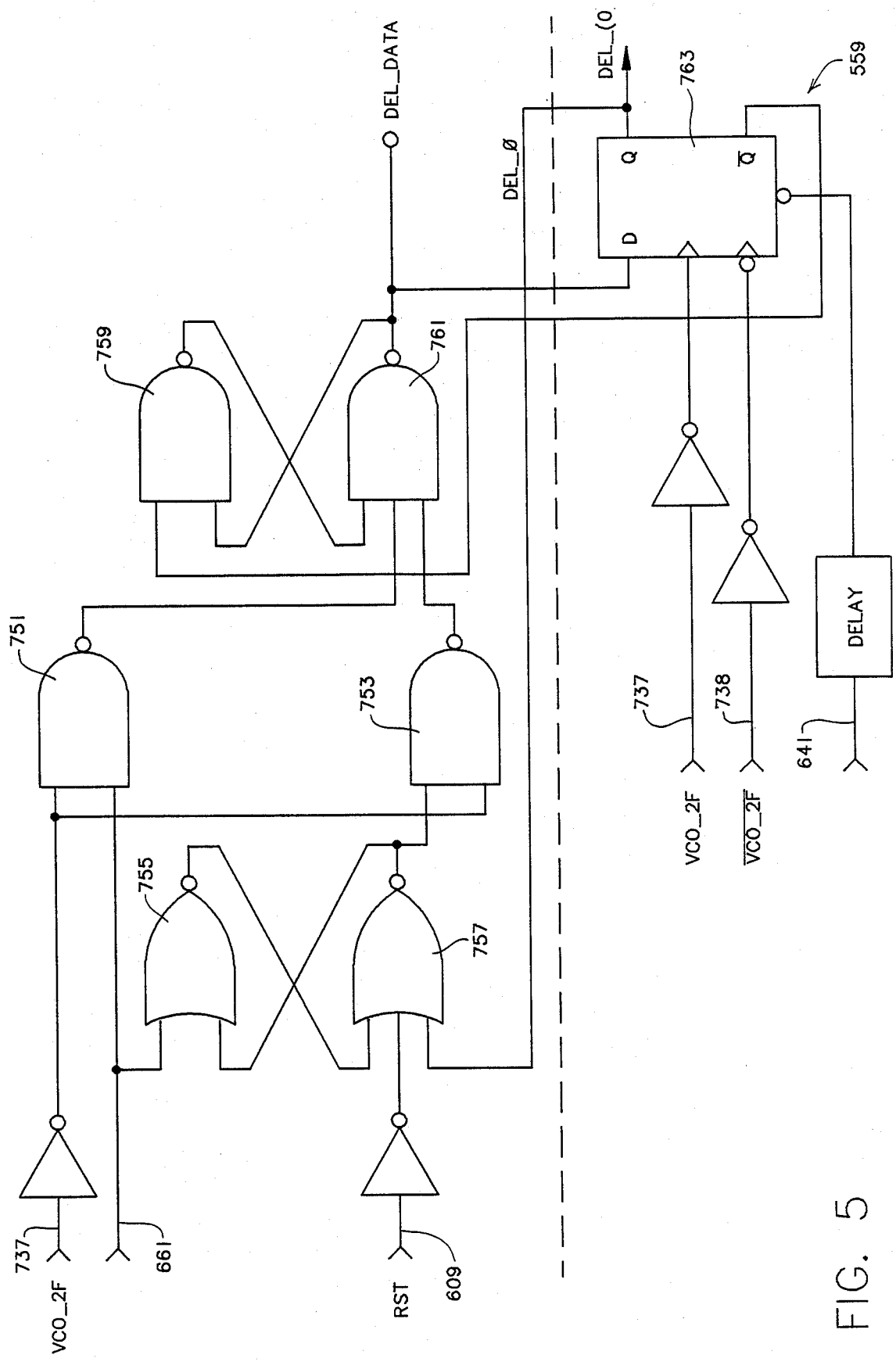
FIG. 5 is a digital logic diagram of a dual data latch arrangement within the data separator 411' which provides a wider data window than otherwise in order to be responsive to early and late arrival of raw data bits read back from a data surface.

Once the selected VCO 673 or 675 locks to the raw data from the disk, the incoming bits are latched in a latch circuit preferably of the form depicted in FIG. 5. By way of background information relating to the FIG. 5 circuit, when a circuit, such as the data separator 411', is preferably implemented as an array of standard CMOS cells of an LSI gate array, transit and state switch times become issues which may be material. One limitation is the width of the data window during which each data pulse may be successfully latched. The circuitry of FIG. 5 extends the duration of the data window during which incoming raw data may be successfully latched and passed on to the decode state machine 559. Two NAND gates 751 and 753 open a window for the last half of a data window which is provided by the VCO_2F signal on the line 737. If a particular data bit occurs early in front of the opened window, a first latch formed by the NOR gates 755 and 757 will catch it and latch up, even though the data pulse lands on the leading edge of the opened window. On the other hand, if the data pulse falls too late for it to propagate through the latch formed by the gates 755 and 757 and thereupon set a second latch formed by NAND gates 759 and 761, a feed forward shunt path for the late pulse becomes available through the gate 751. This shunt path effectively bypasses the latch formed by the gates 755 and 757, and routes the late data pulse directly to the second latch formed by the gates 759 and 761. This bypass enables the late arriving data pulse to reach the second latch in good time to be available to the decode state machine 559 during its incoming data window. The first and second latches are reset in two ways. The power on reset pulse on the line 609 propagates through and resets the first latch (at power on, the state of the second latch is not yet material). Also, after a data bit has been successfully latched into a first decode latch 763 of the decode state machine 559 (shown in FIG. 5), the non-inverting output DEL_0 of the first decode latch 763 is fed back to reset the first latch by virtue of a connection to the gate 757, and the inverting output BAR DEL_0 of the second decode latch is fed back to reset the second latch by virtue of a connection to the gate 759. The first decode latch 763 is clocked by the VCO_2F signal, and it is reset by the signal put out by the start up delay counter on the line 641.

The latch arrangement depicted in FIG. 5 makes the hold time zero and the setup time approximately two nanoseconds. Had a CMOS gate array been configured as a single latch without the bypass gate and second latch, a hold time of approximately two nanoseconds and a setup time of eight nanoseconds would typically have been required. Thus, the apparatus of FIG. 5 and its method of operation provide a considerably greater relative data window margin (tolerance) than heretofore required or achieved in the prior data separator 411 as discussed in the referenced '863 patent, in light of the lower data transfer rate employed in the modular unitary disk file subsystem 5 described therein.

While the modular unitary disk file subsystem 5' of the present invention may be formatted in a virtually unlimited number of formats, as a fixed disk expansion board module adapted for direct plug-in attachment to an IBM TM Personal Computer, or equivalent, a format of the type commonly presented to the disk operating system of such computers is advantageous. A conventional mini-Winchester (five and one quarter inch disk diameter), full height disk drive, i.e., one having a conventional low level interface such as the ST-412 "floppy-based" interface and offering a storage capacity of 42.26 megabytes of formatted data, is typically configured with eight data surfaces and eight data transducer heads, and arranged as two logical volumes (e.g. Fixed Disk 0 and Fixed Disk 1). Each conventional data surface is typically arranged as 612 concentric data tracks, with 17 sectors per track. A standard data transfer rate is typically employed. In the mini-Winchester disk drive of the type being described there are a total of 83,232 sectors each storing a 512 byte block of user data. (FIG. 20 of the referenced '863 patent describes a sector format for a data track having 17 sectors and one spare sector, and should be referred to for format details within each sector.)

Figure 6:
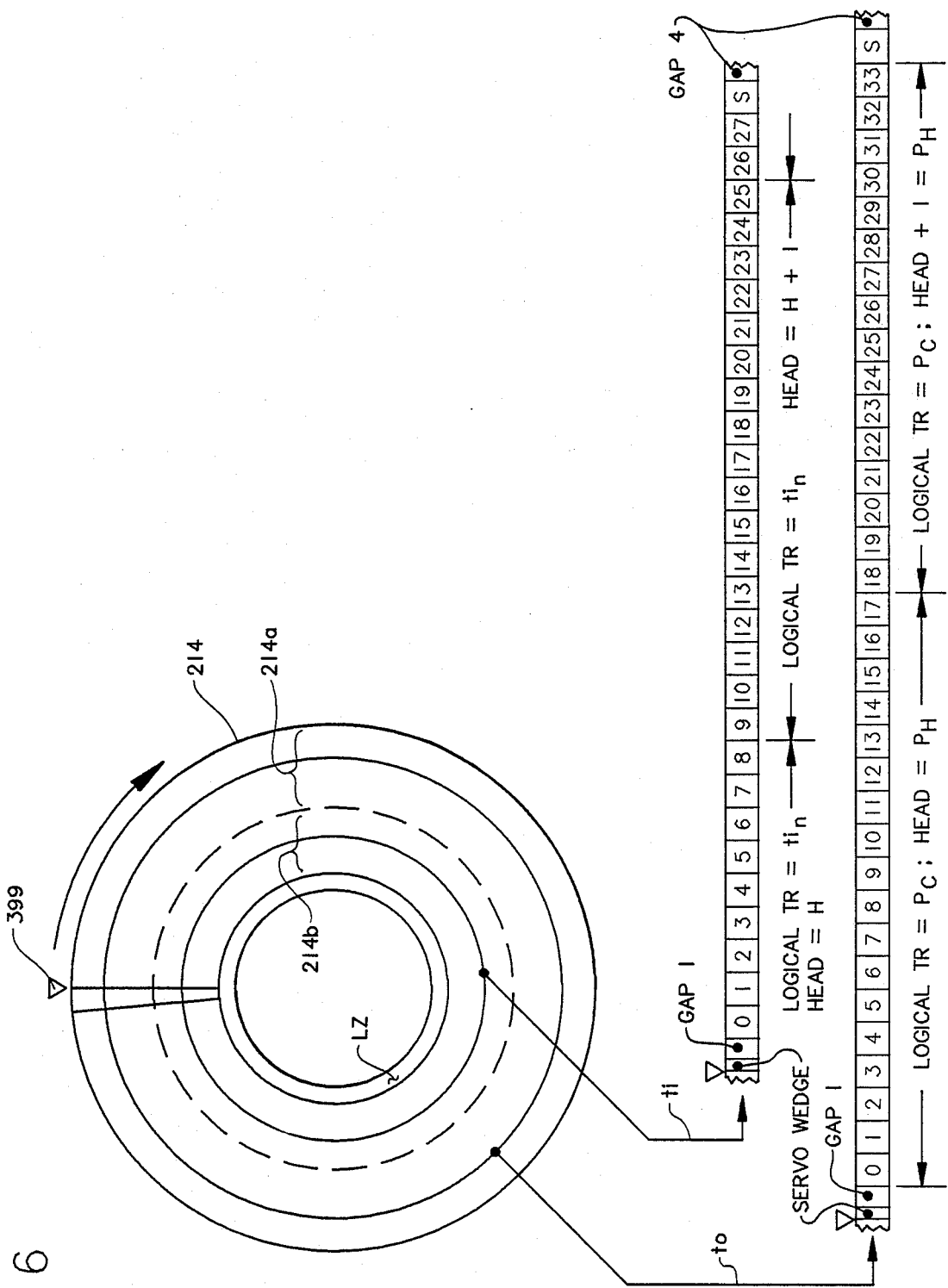
FIG. 6 is a diagram illustrating the mapping of physical disk data storage sectors into logical data sectors for two data zones having differing data transfer rates.

The present invention also provides 83,232 sectors of 512 byte user data blocks arranged as one or more volumes (logical drives). However, instead of being arranged as eight data surfaces, there are four surfaces on two disks 214 and 215 (FIG. 1); and, as already explained, there are two zones of tracks on each surface. As shown in FIG. 6, tracks 0 through 415 each contain 34 sectors numbered 0 through 33, and one spare sector numbered $S_{to}$ (where to equals the physical track identification number for this outer zone track). Tracks 416 through 653 in the inner zone 214b each each contain 28 sectors numbered 0 through 27 plus a spare sector numbered $S_{ti}$ (where ti equals the physical track identification number for this inner zone track). For this discussion, the spare sectors are assumed not to have been placed in service in lieu of a "bad" sector having e.g. a media defect, although in practice, during the factory format operation, if a physical sector is found to contain a media defect or otherwise be determined not to be useable, it is skipped and marked as unusable. The next sector is then assigned the skipped sector's address, and the spare sector is assigned the last sector's address.

It will be appreciated by those skilled in the art that the arrangement of sectors illustrated in FIG. 6 is diagrammatic, rather than actual. In order to provide a more optimized data transfer rate to the host computer, an interleave arrangement is actually employed in practice. In the outer zone 214a, the sector interleave factor is preferably five, while in the inner zone 214b the interleave factor is preferably four. For example, using hexadecimal notation, the physical arrangement of logical sectors and heads for the first physical track of the outer zone is arranged as follows:

Head:   0 |0 |0 |0 |1 |1 |0 |0 |0 |1 |1 |0 |0 |0 |1 |1 |0 |0 |1 |1 |1 |0 |0 |1 |1 |0 |0 |0 |1 |1 |0 |0 |1 |1 |
Sector: 0 |7 |E |4 |B |1 |8 |F |5 |C |2 |9 |10|6 |D |3 |A |0 |7 |E |4 |B |1 |8 |F |5 |C |2 |9 |10|6 |D |3 |A |S wherein the head number is vertically correlated to the sector number in the above table. In the outer zone 214a, the physical interleave of five relative to 34 sectors per track results in a pattern fully recurrent within each track. In the inner zone 214b, with 28 sectors and a physical interleave of four, a less straightforward mapping occurs between physical and logical sectors and as will be further explained hereinafter, the logical sectors are distributed among the available physical tracks and sectors in a continuous fashion, from the first track (Head 0) of the inner zone to the last track of the inner zone (Head 3). However, the controller 314 is programmed to locate and pass the correct sector to the host in response to its command to retrieve the same from the appropriate disk surface.

In the outer zone 214a as suggested above, it is possible to map two conventional logical data storage tracks, track A and track B into a single physical track (to) wherein logical track A would be thought by the host computer to be located on a first logical storage surface and logical track B would be viewed by the host as on a second logical storage surface. Since two logical tracks may be contained within a single physical track in the outer zone, there is a one to one correspondence between the logical cylinder (head stack position) address for the conventional eight surface drive and physical cylinder address for the subsystem 5' of the present invention.

Thus, for logical cylinder addresses lying in the outer zone (tracks 0-415), the subsystem 5' follows host disk operating system commands to seek to the same cylinder address as would be sought in the conventional eight surface drive. The host disk operating system maintains an assignment table which assigns file blocks to a particular drive or volume, logical cylinder (C), head (H) and sector (S) addresses. When the host desires a particular block or string of blocks, these parameters are sent to the subsystem 5' via the host computer bus. This information causes the subsystem 5' to enter a track seek mode in order to access the information, unless the head stack is already located at a physical cylinder location correlated to the logical cylinder address.

Once the physical track is reached in the seek operation, the microcontroller firmware of the subsystem 5' determines whether the head for logical track A or logical track B is being commanded and then causes the subsystem 5' to read back to the host either sectors 0-16 for logical track A, or sectors 17-33 for logical track B. Thus, the logical to physical track mapping for the outer zone 214a involves only the task of mapping a logical head specification to either the first or the second group of 17 physical sectors within a physical track, such as the track $t_o$.

This correspondence may be summarized by the following table:

Pc = C
Ph = INT(H/2) or
   Ph 0 = H0
   Ph 0 = H1
   Ph 1 = H2
   Ph 1 = H3
   Ph 2 = H4
   Ph 2 = H5
   Ph 3 = H6
   Ph 3 = H7
Ps = S (if H is even)
Ps = S + 17 (if H is odd), where Pc equals physical cylinder address, Ph equals physical head select, Ps equals physical sector; and, where C equals logical cylinder, H equals logical head, and S equals logical sector.

When a logical cylinder address exceeds 415, for example, a data block location lying in the inner zone of the subsystem 5' is being accessed. Since there is no integral relationship between the number of physical sectors (28) in the tracks of the inner zone 214b and the number of logical sectors (17) of a track of the conventional eight surface disk drive, derivation of the location of one or more physical sectors lying within the inner zone 214b from a logical cylinder, head and sector address requires the performance of a sequence of calculations or a look up table operation. A calculation is preferred, since a look up table would require a considerably greater size for the control program memory 383. The calculations are typically carried out after the subsystem 5' has received a command from the host operating system to retrieve data from a logical cylinder (C), head (H) and sector (S) location and before the controller 381 commands the actuator structure actually to move to the appropriate physical cylinder location and commands the appropriate head 320 to be selected.

The derivation of the Pc, Ph and Ps locations is based on locating the physical sector by counting forward from the first sector of the inner zone (sector number 56,576) to the destination sector, and then determining in which physical cylinder and head this sector lies. In order to carry out this calculation, a value X corresponding to a translated logical sector address is first derived in accordance with the following:

$$X = ((C - 416)*8 + H)*17 + S$$

Then, from this translated logical sector address, the requisite physical sector, head and cylinder addresses may be derived in accordance with the following:
Ps = X%28,
Ph = (X/28)%4, and
Pc = (X/28)/4 = 416 wherein % = modulus (i.e. the remainder of a divide operation in which the quotient is discarded or ignored) and / = whole number division with discarded remainder.

In FIG. 6, for example, assume that the inner zone physical track ($t_i$) is actually physical cylinder 427 and head 0. In this arrangement the last 9 sectors of logical cylinder 425, head 0, all of the sectors of logical cylinder 425, head 1, and first two sectors of logical cylinder 425, head 2, are contained therein, as shown. In the same FIG. 6, the outer zone physical track ($t_o$) may be any of the logical cylinders 0 through 415, and logical heads 0 and 1.

Having thus described an embodiment of the invention, it will now be appreciated that the objects of the invention have been fully achieved in realizing a completely self contained, compact modular plug-in disk file subsystem having vastly increased (doubled) data storage capacity without any increase in outer physical dimensions (form factor) over the subsystem described in the referenced '863 patent. Widely differing embodiments and applications of the invention will suggest themselves without departing from the spirit and scope of the invention. The disclosures and the description herein are purely illustrative and are not intended to be in any sense limiting.

We claim:

1. A data separator for a disk drive including a rotating disk having a data storage surface including a plurality of zones of concentric data tracks formed on a data storage surface of the disk rotated at substantially constant angular velocity when in operation, there being at least one outer zone of tracks for containing data recorded therein at a first data rate, and an inner zone of tracks for containing data recorded therein at a second data rate, the data separator comprising phase lock oscillator means for aiding decoding of data read from sectors of said disk surface, said phase lock oscillator means for automatically switching its frequency response characteristic in accordance with the selection of a said track as within a said zone so as to be responsive to data recorded at said first data rate and data recorded at said second data rate, said phase lock oscillator means including plural voltage controlled oscillator means, there being one voltage controlled oscillator means adapted for the data rate for each of said zones, and a single charge pump means for generating a control voltage in response to incoming data rate read back from the data surface, said control voltage being applied commonly to control the resonant frequencies of said plural voltage controlled oscillator means, and oscillator disable means supervised by user data controller means of said subsystem so that all of said voltage controlled oscillator means other than the one correlated to a zone in which the head transducer is located are automatically functionally disabled.

2. A data separator for a disk drive as set forth in claim 1 wherein the data separator means includes a dual latch circuit connected to receive raw data bits read back from said surface during a data read operation of said disk drive and including first latch means operatively enabled to latch an incoming raw data bit during a data window generated by said phase lock oscillator, and further including bypass logic means and second latch means for enabling a late arriving raw data bit to bypass said first latch means and to be latched by said second latch means.

3. A data separator for a disk drive as set forth in claim 1 wherein said data separator means includes circuit elements thereof formed together as a single monolithic large scale integrated CMOS circuit array.

* * * * *